United States Patent [19]
Robins

[11] 3,948,824
[45] *Apr. 6, 1976

[54] CELLULAR POLYMERIC MASSES

[75] Inventor: Janis Robins, St. Paul, Minn.

[73] Assignee: Ashland Oil, Inc., Ashland, Ky.

[ * ] Notice: The portion of the term of this patent subsequent to Dec. 23, 1986, has been disclaimed.

[22] Filed: Mar. 22, 1974

[21] Appl. No.: 454,030

Related U.S. Application Data

[63] Continuation of Ser. No. 287,387, Sept. 8, 1972, abandoned, which is a continuation of Ser. No. 109,947, Jan. 26, 1971, abandoned, which is a continuation-in-part of Ser. Nos. 72,113, Sept. 14, 1970, abandoned, and Ser. No. 723,873, April 24, 1968, abandoned, and Ser. No. 596,106, Aug. 1, 1966, abandoned, and Ser. No. 536,180, March 14, 1966, Pat. No. 3,485,797.

[52] U.S. Cl... 260/2.5 F; 260/2.5 AM; 260/2.5 AN; 260/2.5 AP; 260/2.5 AT; 260/838; 260/843
[51] Int. Cl.² C08G 14/14; C08G 18/14; C08G 18/18
[58] Field of Search..... 260/2.5 AM, 2.5 AN, 2.5 R, 260/2.5 AP, 2.5 AT, 2.5 F, 843, 838

[56] References Cited
UNITED STATES PATENTS

| | | | |
|---|---|---|---|
| 2,608,536 | 8/1952 | Sterling | 260/2.5 AM |
| 2,764,566 | 9/1956 | Simon | 260/2.5 AN |
| 2,806,006 | 9/1957 | Proctor | 260/2.5 AM |
| 3,063,964 | 11/1962 | Khawam | 260/2.5 AM |
| 3,282,896 | 11/1966 | Einberg | 260/2.5 AM |
| 3,409,579 | 11/1968 | Robins | 260/30.4 |
| 3,429,848 | 2/1969 | Robins | 260/38 |
| 3,485,797 | 12/1969 | Robins | 260/77.5 AM |
| 3,689,440 | 9/1972 | Glaesmann | 260/2.5 AM |
| 3,706,680 | 12/1972 | Booth | 260/2.5 AM |

OTHER PUBLICATIONS

Hackh's Chemical Dictionary, 3rd Ed., Grunt, McGraw–Hill, N.Y., 1944, p. 607.

*Primary Examiner*—John Kight, III

[57] ABSTRACT

Heat stable foams in which the cellular material is composed of the cured reaction product of polyisocyanate and solvent-soluble phenolic resin having benzylic ether linkage.

7 Claims, No Drawings

CELLULAR POLYMERIC MASSES

RELATED APPLICATIONS

This is a continuation of application Ser. No. 287,387, filed Sept. 8, 1972, now abandoned, which was a continuation of Ser. No. 109,947, filed Jan. 26, 1971, now abandoned, which was a continuation in part of Ser. Nos. 72,113 filed Sept. 14, 1970, now abandoned, of Ser. No. 723,873, filed Apr. 24, 1968, now abandoned, of Ser. No. 596,106, filed Aug. 1, 1966, now abandoned, and of Ser. No. 536,180, filed Mar. 14, 1966, now U.S. Pat. No. 3,485,797.

BACKGROUND

Cellular polymeric masses are important components of many commercial products, as they are adaptable to a wide variety of functions including, without limitation, insulating, floatation, sound-deadening, cushioning, filtering, packaging, reinforcing and the like. Such masses are commonly referred to as foams. They contain cells, pores, voids or other spaces which are referred to herein as cells. By techniques already well within the skill of the art, the foams may be formed with varying densities and cell sizes and with varying degrees of intercommunication between cells, depending on their intended use. Thus, predominantly closed-cell foams are used for floatation, while open-cell foams are used for filtration.

Thermal stability is the ability to withstand prolonged exposure to elevated temperature without undue loss of strength, distortion, melting, or decomposition. Without thermal stability, polymeric foams are virtually useless for certain structural and thermal insulating applications.

As the present invention employs reaction products of phenolic resins and polyisocyanates, it is of interest to note that these reactants have previously been combined in the attempt to make adhesives, coatings and foams. U.S. Pat. No. 3,242,107, reports the known fact that phenolic resins prepared under acid conditions can be reacted with isocyanates. However, the resulting urethanes revert into the phenol and the isocyanate at temperatures above about 150°C and therefore have very poor heat stability. The urethanes in question of course include bonds formed by reaction of "nuclear" or "phenolic" hydroxyl groups in the resin structure with isocyanate groups in the polyisocyanate to form the urethane bond. The instability of such bonds is widely known. In fact, this instability is used to advantage to "block" isocyanate compounds; that is, in order to temporarily deactivate them, the isocyanates are often reacted with phenolic compounds to form temporary urethane bonds from which the isocyanate may be released and returned to its original unreacted state by gentle to moderate heating. Thus, as reported in U.S. Pat. Nos. 3,268,467 and 3,226,276, such bonds are both temporary and deficient in bond strength. As reported in the literature, *Industrial and Engineering Chemistry*, December 1962, "The Thermal Dissociation of Blocked Isocyanates", unblocking or the decomposition of the product of reaction of an isocyanate and a phenolic hydroxyl group may commence at temperatures as low as 50° to 80°C.

In view of the foregoing, one would expect that products derived from reacting phenolic resin with isocyanate would generally have poor heat stability. In recognition of this, the art has turned to the use of phenolic resins from phenols with alkyl substituents located in the para position; to the replacement of the phenolic hydroxyl groups of the phenolic resin with hydroxyalkyl groups, which are known to form more stable bonds with isocyanates, U.S. Pat. Nos. 3,127,373, 3,144,419 and 3,265,641; and to simultaneous employment of both of these measures, U.S. Pat. No. 3,242,107, discussed above. The present invention is believed to be non-obvious, in that it makes possible the production of heat stable foams without the necessity of employing the above-mentioned measures.

BRIEF SUMMARY OF THE INVENTION

The structure or matrix of the heat-stable foams of the present invention comprises a product of reaction between phenolic benzylic ether resin and polyisocyanate. Such products are referred to as "thermoset" or "cured", in that the reaction has been carried to the point where the product is infusible and substantially insoluble in solvents which normally dissolve the resin itself. While not wishing to be bound by any theory, it is believed that in the heat-stable foams of the invention, molecules of resin are chemically connected to one another in a three-dimensional network. These connections are believed to include urethane linkages formed by reaction of isocyanate groups of polyisocyanate compounds with phenolic hydroxyl groups of the resin. Where the resin also contains methylol groups, urethane linkages may also form by reaction of them with the aforesaid isocyanate groups.

The phenolic resins employed in the present invention are characterized by containing one or more units having the formula:

(I) 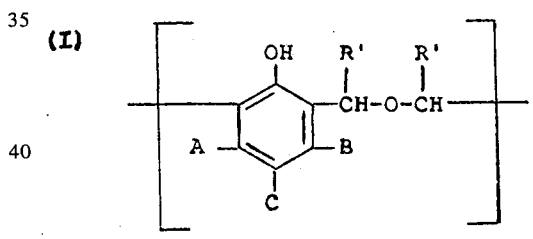

wherein A,B, and C are hydrogen, hydrocarbon radicals, oxyhydrocarbon radicals or halogen, R' is individually a hydrogen or a hydrocarbon radical of 1 to 8 carbon atoms. The resins have average degrees of polymerization, as measured by the number of repeating aromatic rings, of 3 to 100, and preferably about 4 to 10. Although higher molecular weight resins are operable in the curing reactions above described such resins are difficult to handle from the standpoint of viscosity.

The described benzylic ether resins are condensation polymers of a phenol having the general formula:

(II) 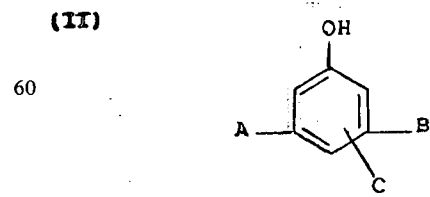

wherein A,B and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms, prepared in the liquid phase in the substantial absence of water at temperatures below about 130°C in the presence of catalytic concentrations of a metal ion dissolved in the reaction medium. The molar ratio of aldehyde to phenol can generally be varied from 3:1 to 1:1, although some resin is also formed outside these ratios. The preparation and characterization of these resins is disclosed in greater detail in the above-mentioned application Ser. No. 536,180 filed Mar. 14, 1966, now U.S. Pat. No. 3,485,797. In the preferred form, these resins have the general formula:

(III) 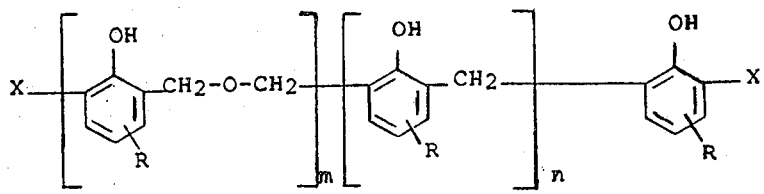

wherein R is a hydrogen or a phenolic substituent meta to the phenolic hydroxyl group, the sum of $m$ and $n$ is at least 2 and the ratio of $m$-to-$n$ is at least 1, X is an end-group from the group consisting of hydrogen and methylol, the molar ratio of said methylol-to-hydrogen end-groups being at least 1.

The most preferred benzylic ether resins employed in the resin compositions of the present invention are those in which R is hydrogen. The phenols employed in the formation of the benzylic ether resins are generally all phenols which have heretofore been employed in the formation of phenolic resins generally, and which are not substituted at either of the carbon atoms ortho to the hydroxyl group. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic resins include: alkyl substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 6 carbon atoms. Specific examples of suitable phenols, aside from the preferred unsubstituted phenol, include: m-crosol, p-crosol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, p-chclohexyl phenol, p-octyl phenol, 3,5-dicyclohexyl phenol, p-phenyl phenol p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The isocyanates useful in the present invention comprise aliphatic, cycloaliphatic or aromatic polyisocyanates having preferably from 2 to 5 isocyanate groups. If desired, mixtures of polyisocyanates can be employed. Less preferably, isocyanates prepolymers formed by reacting excess polyisocyanate with a polyhydric alcohol, e.g. a prepolymer of toluene diisocyanae and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 3,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, xylylene diisocyanate, and the methyl derivatives thereof, polymethylenepolyphenol isocyanates, chlorophenylene-2,4-diisocyanate, and the like. Although all polyisocyanates react with the described phenolic resin to form a cross-linked polymer structure, the preferred polyisocyanates are aromatic polyisocyanates and particularly diphenylmethane diisocyanate, triphenylmethane triisocyanate, complex commercially-available compositions containing polymeric isocyanates, sold under such trademarks as "PAPI", "Mondur MR" and "NCO-120" and mixtures thereof.

The polyisocyanate is employed in sufficient concentrations to cause the curing of the phenolic resin and other active hydrogen-containing materials when present. This refers to materials with hydrogen atoms which display activity according to the well-known Zerewitinoff method as described by Kohlen in JACS, 49, 3181 (1927). Thus, for example, phenol-formaldehyde resins of the Novolac and/or resole types having an average of two or more active hydrogen atoms per molecule may be employed. For information on Novolacs and resoles the disclosures of U.S. Pat. Nos. 3,242,107 and 3,409,571 and British Patents 757,392 and 773,510 are hereby incorporated by reference to the extent pertinent. The total weight of such other active hydrogen-containing material should not exceed three times the weight of the benzylic ether resin and should preferably be less than that of the benzylic ether resin. In general, the polyisocyanate will be employed in a range of 10 to 500 weight percent of polyisocyanate based on the weight of the benzylic ether resin and other active hydrogen-containing materials. Preferably, from 20 to 300 weight percent of polyisocyanate on the same basis is employed. The polyisocyanate is employed in liquid form. Liquid polyisocyanates can be employed in undiluted form. Solid or viscous polyisocyanates are most conveniently employed in the form of organic solvent solutions.

In general, the known manipulative techniques of the urethane foam art are applicable to the formation of the foams of the present invention. Thus, the foams may be prepared by prepolymer or so-called "one shot" techniques with conventional blowing agents and with or without conventional solvents and catalysts. However, it is an advantage of the invention that the resultant foams are suprisingly tough and resilient when produced with the aid of certain preferred basic catalysts to be described hereinafter.

GENERAL COMMENTS

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are certain halogen-substituted aliphatic hydrocarbons which have boiling points between about −40°C and 70°C, and which vaporize at or below the temperature of the foaming mass. The blowing agents include, for example, trichloromonofluoromethane, dichlorodifluoromethane, dichloromonofluoromethane, dichloromethane, trichloromethane bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2-chloro-1,1,1,2,3,3,4,4,4-nonafluorobutane, hexafluorocyclobutene, and octofluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes the thermally unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

In previous experience with the production of foams from phenolic resins and polyisocyanates, the resultant foams have exhibited the undesireable property of moderate to extreme friability. It has been found however, that foams produced through the reaction of the above-described benzylic ether resin with polyisocyanate in the presence of the preferred blowing agents and certain basic catalysts are tough and resilient. The tertiary amines as described in U.S. Pat. Nos. 3,422,165 and 3,412,047 are useful. Most preferred are organic bases having $pK_b$ values in the range of about 7 to about 11, such as phenylpropylpyridine. The catalysts are employed in small amounts, for example, from about 0.001 percent to about 5 percent, based on weight of the reaction mixture. Within this range of catalyst concentration, using the preferred catalysts, it is possible to prepare foamed products of varying density, good resistance to solvents, and little or no tendency to support combustion; and they may be prepared without the application of external heat.

The invention is illustrated by the following examples in which all parts are by weight unless the contrary is clearly indicated.

EXAMPLE 1

75 parts phenol, 35.5 parts paraformaldehyde (91%), 0.1 parts lead naphthenate (24% Pb) and 0.05 parts of lead oxide are charged to a kettle, heated, and maintained therein for two hours at 110°–130°C with continuous removal of water until free formaldehyde decreases to 1%. A vacuum is then applied to strip residual water, following which the resultant benzylic ether resin corresponding generally to structural formula III, above, is cooled and drained from the kettle.

EXAMPLE 2

116 parts adipic acid and 62 parts 1.4 butane diol are charged to a kettle, heated and esterified at 232° to 237°C until water stops coming off. After cooling the reaction mass to 150°C, 31 parts of trimethylol propane are added. The kettle contents are again heated to and maintained at 232°–237°C until water stops coming off. The kettle contents are again cooled in order to permit addition of 6 parts xylene, following which esterification is again continued at 232° to 237°C until an acid value, based on non-volatiles, is attained. The resultant polyester resin is then cooled and drained from the kettle.

EXAMPLE 3

80 parts of the benzylic ether resin of example 1 are condensed with 20 parts of the polyester resin of example 2 by heating them in admixture for one hour at 127°C in a kettle. Then the kettle contents are cooled and drained.

EXAMPLE 4

Into an open top cylindirical foaming mold are charged a mixture of 33 parts of the product of example 3, 42 parts of a liquid MDI type isocyanate manufactured and sold by Upjohn under their trademark "143L", 0.4 parts of silicone oil emulsifier manufactured and sold by Union Carbide under their trademark "L-5320", 0.4 parts of dioctylphthalate, 0.2 parts of a 50% solution of 4-phenyl propyl pyridine, 0.1 parts of a 50% commercial (Dabco) solution of triethylene diamine, and 7 parts of a halogen-substituted aliphatic hydrocarbon blowing agent manufactured and sold by Du Pont under their trademark "Freon 11-B". The mixture foams and cures spontaneously at room temperature without the application of external heat into a tough, non-friable foam.

EXAMPLE 5

A sample of the foam product of example 4 is placed in an oven maintained at 150°C. After 15 minutes, a slight softening is noted, but the product retains its shape and is only slightly discolored. After 1½ hours at 150°C, the temperature is raised to 218°C for an additional hour. Although the foam darkens somewhat more, it does not decompose, and the original clearly defined cell structure is visible. After a total of 2½ hours at or above 150°C, the foam is cooled and the average horizontal and vertical shrinkage is found to be less than 5%.

EXAMPLE 6

Example 4 is repeated replacing the product of example 3 with a like amount of the resin of example 1, omitting the triethylene diamine, doubling the quantity of 4-phenylpropylpyridine and increasing the quantity of Freon 11-B to 9.5 parts. When the resultant product is tested by the procedure of example 5, similar results are obtained.

EXAMPLE 7

56 parts of phenol, 58 parts of formalin (37%), 2 parts of NaOH (50% aqueous) are charged to a kettle and heated to about 60°C. After the reaction exotherm takes effect, cooling is applied to maintain temperature at about 77°C for about 2 hours as the reaction continues. Then 6 parts of paratoluene sulfonic acid solution (50% aqueous) is introduced, following which vacuum is continously applied to dehydrate the reaction mass until the temperature rises to 88°C, whereupon the resultant resole resin is cooled and drained from the kettle.

EXAMPLE 8

A foaming mix is prepared from 42 parts of 143L, 33 parts of the resole resin of example 7, 0.4 parts of "L-5320", 0.4 parts of dioctylphthalate, 0.4 parts of 4 phenylpropylpyridine, and 9.5 parts of Freon 11-B and is foamed in a mold. Its compressive strength is markedly less than that of the foams of examples 4 and 6 and it is quite friable.

What is claimed is:

1. Cellular polymeric masses, the polymeric composition of which comprises the reaction product of a mixture containing
    a. phenolaldehyde benzylic ether resin comprising the reaction product of a phenol having the general formula:

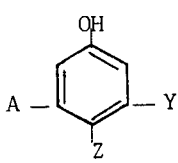

wherein, A, Y and Z are hydrogen, hydrocarbon radicals, oxyhydrocarbon radicals or halogen, with an aldehyde having the general formula R'CHO, wherein R' is hydrogen or a hydrocarbon radical of 1–8 carbon atoms, at a mole ratio of aldehyde to phenol of greater than 1, in the liquid phase under substantially anhydrous conditions with the removal of water above 100°C. and at temperatures below about 130°C. in the presence of catalytic concentrations of a soluble divalent metal salt dissolved in the reaction medium;
    b. a polyisocyanate;
    c. a source of foaming gas.

2. The product of claim 1 wherein said phenolaldehyde benzylic ether resin has the general formula:

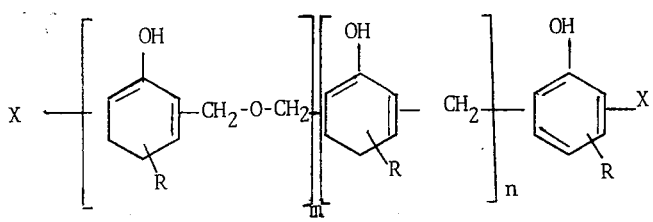

wherein R is a hydrogen, hydrocarbon radical, oxyhydrocarbon radical or halogen meta to the phenolic hydroxyl group, the sum of $m$ and $n$ is at least 2 and the ratio of $m$- to -$n$ is at least 1, and X is an end-group selected from the group consisting of hydrogen and methylol with the molar ratio of said methylol-to-hydrogen end-groups being at least 1.

3. The product of claim 1 wherein said reaction product is the product of reaction of said phenol-aldehyde benzylic ether resin and said polyisocyanate in the presence of tertiary amine catalyst.

4. The product of claim 2 wherein said polyisocyanate is a liquid aromatic diisocyanate.

5. The product of claim 4, wherein the aldehyde in said phenol-aldehyde resin is formaldehyde.

6. The product of claim 2, wherein said source of foaming gas is water.

7. The product of claim 2 wherein said source of foaming gas is a blowing agent which is vaporized at the reaction temperature.

* * * * *